United States Patent
Takahashi et al.

(10) Patent No.: US 8,401,909 B2
(45) Date of Patent: Mar. 19, 2013

(54) CONTENT DISTRIBUTION SYSTEM AND CONTENT DISTRIBUTION METHOD

(75) Inventors: Kazuya Takahashi, Tokyo (JP); Masaya Aihara, Tokyo (JP); Akira Yamashita, Tokyo (JP); Osamu Ikeda, Tokyo (JP); Jun Iwasaki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 289 days.

(21) Appl. No.: 12/673,657

(22) PCT Filed: Dec. 16, 2008

(86) PCT No.: PCT/JP2008/072877
§ 371 (c)(1),
(2), (4) Date: Feb. 16, 2010

(87) PCT Pub. No.: WO2009/110156
PCT Pub. Date: Sep. 11, 2009

(65) Prior Publication Data
US 2011/0137746 A1 Jun. 9, 2011

(30) Foreign Application Priority Data
Mar. 3, 2008 (JP) ................................. 2008-051745

(51) Int. Cl.
*G06Q 30/00* (2012.01)
(52) U.S. Cl. ..................................... 705/26.1; 706/27.1
(58) Field of Classification Search .................... 705/26, 705/27, 26.1, 27.1
See application file for complete search history.

(56) References Cited

U.S. PATENT DOCUMENTS

| 5,917,912 A | 6/1999 | Ginter et al. |
| 7,246,228 B2 | 7/2007 | Sato et al. |

(Continued)

FOREIGN PATENT DOCUMENTS

| JP | 2001236388 A | 8/2001 |
| JP | 2002132584 A | 5/2002 |

(Continued)

OTHER PUBLICATIONS

E-mail viruses: how organizations can protect their e-mails, Dong-Her Shih; Hsiu-Sen Chiang. Online Information Review28. 5 (2004): 356-366, downloaded from ProQuestDirect on the Internet on Nov. 27, 2012, 8 pages.*

(Continued)

*Primary Examiner* — James Zurita
(74) *Attorney, Agent, or Firm* — Edwards Wildman Palmer LLP; Brian R. Landry (57) ABSTRACT

A content distribution system which assures reliability of content is provided. Permitted-user information corresponding to a user who is permitted to use content to be distributed is associated with the content. In the case where user specific information which specifies a user and the permitted-user information do not have a predetermined relation, a user terminal transmits the user specific information and the permitted-user information to a server. The server generates user-related information in which the received user specific information is set as a distribution destination and the permitted-user information is set as a distributor, generates new permitted-user information so as to have the predetermined relation with the user specific information, and provides the new permitted-user information to the user terminal. The user terminal which obtains the new permitted-user information changes the permitted-user information to the new permitted-user information.

9 Claims, 10 Drawing Sheets

U.S. PATENT DOCUMENTS

2003/0154132 A1* 8/2003 Ogawa et al. .................. 705/16
2004/0249768 A1  12/2004 Kontio et al.
2007/0124603 A1* 5/2007 Yamamichi et al. .......... 713/194

FOREIGN PATENT DOCUMENTS

| JP | 2006139335 A | 6/2006 |
|---|---|---|
| WO | 98/10381 A1 | 3/1998 |
| WO | 0133546 A1 | 5/2001 |

OTHER PUBLICATIONS

Supplementary European Search Report dated Nov. 28, 2012 for EP Application No. 08873171.6.

* cited by examiner

CONTENT DISTRIBUTION SYSTEM AND CONTENT DISTRIBUTION METHOD

CROSS-REFERENCE TO PRIOR APPLICATION

This is the U.S. National Phase Application under 35 U.S.C. §371 of International Patent Application Serial No. PCT/JP2008/072877, filed Dec. 16, 2008, which claims the benefit of Japanese Patent Application Serial No. 2008-051745, filed Mar. 3, 2008, both of which are entirely incorporated by reference herein. The International Application was published in Japanese on Sep. 11, 2009 as WO 2009/110156 A1 under PCT Article 21(2).

TECHNICAL FIELD

The present invention relates to a content distribution system and a content distribution method for distributing content to a plurality of users.

BACKGROUND ART

Illegal copy of content such as a computer program, an image, and music (hereinbelow, collectively called "content") without proper purchase procedures has become a problem. As methods of preventing the illegal copy, the method is already known that a copy preventing function or a limitation of the number of copying times is provided to a proper product. On the other hand, a billing system is also known, in which copying is regarded as "distribution" and content copied without proper purchase procedures can be used only after performing predetermined billing process (see, for example, International Published Patent Application WO 01/033546).

SUMMARY

However, although the billing process can be performed on copied content in a conventional billing system, there is no system which ensures reliability of each content by managing routes of distributing content.

An object of the present invention is to provide a content distribution system and a content distribution method ensuring reliability of content.

The present invention solves the above-described problem by the following means.

A content distribution system of the present invention solves the above problems by being constructed as a content distribution system including a user terminal being operated by a user and a server capable of transmitting/receiving data to/from the user terminal, wherein the user terminal comprises: a specific information obtaining unit for obtaining user specific information which specifies the user; a content storing unit for storing a content with which permitted-user information indicative of a user permitted to use the content is associated; a status determining unit for determining that a user corresponding to the user specific information is permitted to use the content in a case where the user specific information and the permitted-user information has a predetermined relation, and determining that the use is not permitted to use the content in a case where the user specific information and the permitted-user information does not have the predetermined relation; a content processing unit for executing a process using the content in a case where it is determined by the status determining unit that the use is permitted; a permission process requesting unit for, in a case where the status determining unit determines that the use is not permitted, transmitting to the server, the user specific information obtained by the specific information obtaining unit and the permitted-user information associated with the content; and a change processing unit for, when new permitted-user information is obtained from the server, changing the permitted-user information associated with the content to the new permitted-user information, and the server comprises: a user-related-information generating unit for generating and storing user related information in which the user specific information transmitted from the user terminal is set as a distribution destination and the permitted-user information is set as a distributor; and a new permitted-user information generating unit for generating and providing to the user terminal, the new permitted-user information so as to have the predetermined relation with the user specific information transmitted from the user terminal.

According to the present invention, the content to be distributed is stored in the content storing unit. Therefore, it is possible to obtain the content by directly copying it from another user terminal or via a recording medium on which the content is copied. However, the content can be used only in the case where the permitted-user information associated with the content and the user specific information has a predetermined relation. Since the permitted-user information at the moment of obtaining the content is information generated so as to correspond to the user specific information of the distributor, in order to allow a new user to use the content, it is necessary to rewrite the permitted-user information associated with the content so as to correspond to the user specific information of the new user. In the present invention, in the new permitted-user information generating unit of the server, new permitted-user information is generated on the basis of the user specific information of the new user, and the permitted-user information associated with the content is changed to the new permitted-user information in the change processing unit of the user terminal. In this manner, the permitted-user information is rewritten so as to correspond to a new user each time the content is obtained by the new user. On the other hand, in the server, the user-related information generating unit generates user-related information in which the user specific information of a new user is set as a distribution destination and the present permitted-user information associated with the content is set as a distributor. Therefore, by tracing the distributor or the distribution destination in the user related information, a distribution route of one content can be checked. Thereby, the reliability of the source of content to be distributed can be assured, and it is also effective to analyze a cause when a trouble occurs.

In the case where a condition for a user to use the content exists, such as purchase, contract, or the like, the present invention may be applied to content preliminarily satisfying the condition. Alternatively, the present invention may be constructed such that until the permitted-user information is changed by the changing process, it is determined whether the condition is satisfied or not in the system to execute the changing process only when the condition is satisfied. The process for making the user satisfy the condition may be executed in the server of the present invention or in another site.

The mode of "generating the new permitted-user information so as to have the predetermined relation with the user specific information" includes a case where the new permitted-user information is generated by processing the user specific information itself, a case by adding further information other than the user specific information to be processed, and a case by using a correspondence table or the like. The process includes an encrypting process and a simple converting process. The "predetermined relation" includes a relation of match, a relation which can be derived by a predetermined procedure such as a formula, a relation associated with a correspondence table, and the like. The mode of obtaining the user specific information by the specific information obtaining unit includes a case of obtaining the user specific information by being inputted by the user, and a case of obtaining the user specific information which is pre-stored in the user terminal.

The user terminal may have a unique information storing unit for storing terminal unique information which is unique to the user terminal, and the specific information obtaining unit may obtain, as the user specific information, the terminal unique information from the unique information storing unit. Thereby, the user terminal can be dealt as the user of the present invention, and the system can be realized without requesting entry of user specific information by the user. That is, the use of content distributed can be managed on a user terminal basis. As terminal unique information which is unique to the user terminal, for example, in the case where the user terminal is a portable phone, an individual identification number (UID) and information unique to the user recorded on an SIM card or UIM card can be applied. In the case where the user terminal is a computer, an MAC address (Media Access Control address) or the like can be applied.

The user terminal may comprise: a permission information storing unit for storing permission information indicative of whether the user specific information and the permitted-user information has the predetermined relation or not; and a permission information control unit for controlling the permission information so as to indicate that the predetermined relation is not established until the permitted-user information is changed by the change processing unit, and indicate that the predetermined relation is established when the permitted user information is changed, and the status determining unit may determine whether the use is permitted or not by referring to the permission information.

When the permitted-user information is changed once so as to have a predetermined relation with the user specific information, it is set in permission information that the permitted-user information has the predetermined relation. Consequently, in the user terminal whose permitted-user information is once changed, after that, the content can be used under any kind of the permitted-user information associated with the content. Therefore, even in the case where the user owning the user terminal loses or erases the content, by obtaining new content and copying it in the content storing unit, the user can use the content under any kind of the permitted-user information associated with the content.

The user terminal may be capable of connecting to a purchase site for performing a purchasing process related to purchase of the content, the permission process requesting unit of the user terminal may include a purchasing process determining unit for determining that the purchasing process is not performed when the user-related information in which the user terminal information is set as the distribution destination is not stored in the server, and when it is determined that the use is not permitted and that the purchasing process is not performed, may transmit a purchase registration request including the user specific information and the permitted-user information. The user-related information generating unit of the server which receives the purchase registration request may generate the user-related information by the user specific information and the permitted-user information included in the received purchase registration request, further, may generate and transmit to the user terminal, information necessary for connection to the purchase site. The user terminal may have a content purchasing unit for connecting to the purchase site by the necessary information obtained from the server, and a new permitted-user information generating unit of the server may generate the new permitted-user by the user specific information corresponding to a user who has performed the purchasing process.

Thereby, whether the purchasing process is performed or not is determined depending on the presence or absence of user-related information in which the user specific information is set as a distribution destination. In the case where the user-related information is not stored, the user may be urged to perform the purchasing process. To a user who performed the purchasing process, new permitted-user information can be provided. The mode of determining whether the purchasing process has been performed or not includes a case where a purchase completion notification including the user specific information is transmitted from a purchase site to the user terminal directly or via a server and the purchase completion notification is held in the user terminal, and a case where the purchase completion notification is transmitted to the server and held in the server. "Information necessary for purchase" includes an account ID, a password, and the like for accessing the purchase site.

The user-related information generating unit of the server may generate, as the necessary information, purchasing process identifying information uniquely given to the user, transmit the generated purchasing process identifying information to the user terminal, and store the generated purchasing process identifying information so as to be associated with the generated user-related information. The server may have a post purchase processing unit for, when obtaining the purchasing process identifying information used for the purchasing process from the purchase site, specifying the user-related information corresponding to the purchasing process identifying information, and associating purchase information indicating that the purchasing process has been performed with the specified user-related information. The purchasing process determining unit in the user terminal, in a case where the user-related information is stored, may determine whether the purchasing process has been performed or not by referring to the purchase information. The permission process requesting unit of the user terminal, in a case where the purchasing process determining unit determines that the purchasing process has been performed, may transmit a new user information request including the user specific information. The new permitted-user information generating unit of the server, on receipt of the new user information request, may generate the new permitted-user information by the user specific information included in the new user information request.

Thereby, even after the user-related information is generated, whether the purchasing process has been performed or not is determined by the purchase information. Consequently, generation of the user-related information and the purchasing process can be performed at different timings. Thereby, the user can perform the purchasing process at his/her convenience. With respect to content once subjected to the purchasing process, even if the permitted-user information is different, new permitted-user information is issued to a new user, and permitted-user information associated with content is changed to the new permitted-user information.

The server may comprise a benefit adding device for specifying the user specific information having the predetermined information with the permitted-user information which is set as the distributor in the user-related information, retrieving the user-related information in which the specified user specific information is set as the distribution destination, and adding predetermined benefit information to the retrieved user related information. Thereby, to user-related information corresponding to a user who distributed content to another user, a benefit is given in accordance with the number of content distributed. By giving a benefit to the user, motivation of distributing content can be increased. The benefit information includes information indicative of points, a benefit itself, and the like.

The new permitted-user information generating unit may generate the new permitted-user information by encrypting the user specific information. Thereby, the permitted-user information in the user terminal can be prevented from being illegally rewritten.

The system can be detachably attached to the user terminal, and the user terminal may be a portable terminal. In particular, in the case of a portable terminal, for example, it takes long time to download large-amount data such as image data and music data used in a game and the communication environment is not perfect. However, when the large-amount data is the content which is distributed via a predetermined recording medium, the large-amount data can be distributed without any problem even to a portable terminal.

A content distribution of the present invention solves the above problems by being constructed as a content distribution method performed by a user terminal operated by a user and a server capable of transmitting/receiving data to/from the user terminal, wherein the user terminal performs: a step of obtaining user specific information which specifies the user; a step of storing a content with which permitted-user information indicative of a user permitted to use the content is associated; a step of determining that a user corresponding to the user specific information is permitted to use the content in a case where the user specific information and the permitted-user information has a predetermined relation, and determining that the use is not permitted to use the content in a case where the user specific information and the permitted-user information does not have the predetermined relation; a step of executing a process using the content in a case where it is determined that the use is permitted; a step of transmitting, in a case where it is determined that the use is not permitted, to the server, the obtained user specific information and the permitted-user information associated with the content; and a step of changing, when new permitted-user information is obtained from the server, the permitted-user information associated with the content to the new permitted-user information, and the server performs the steps of: a step of generating and storing user related information in which the user specific information transmitted from the user terminal is set as a distribution destination and the permitted-user information is set as a distributor; and a step of generating and providing to the user terminal, the new permitted-user information so as to have the predetermined relation with the user specific information transmitted from the user terminal. By executing the processes of the present invention by the control units of the user terminal and the server, the processes are realized as the above mentioned content distribution system.

As described above, according to the present invention, the content to be distributed is associated with permitted-user information corresponding to a user permitted to use the content. When user specific information which specifies a user and the permitted-user information does not have a predetermined relation, a user terminal transmits the user specific information and the permitted-user information to a server. The server generates user-related information in which the received user specific information is set as a distribution destination and new permitted-user information so as to have a predetermined relation with the received user specific information to provide the new permitted-user information to the user terminal. The user terminal which has obtained the new permitted-user information changes the permitted-user information to the new permitted-user information. Thereby, the content distribution system and the like which assures reliability of content can be provided.

DETAILED DESCRIPTION

Figure 1:
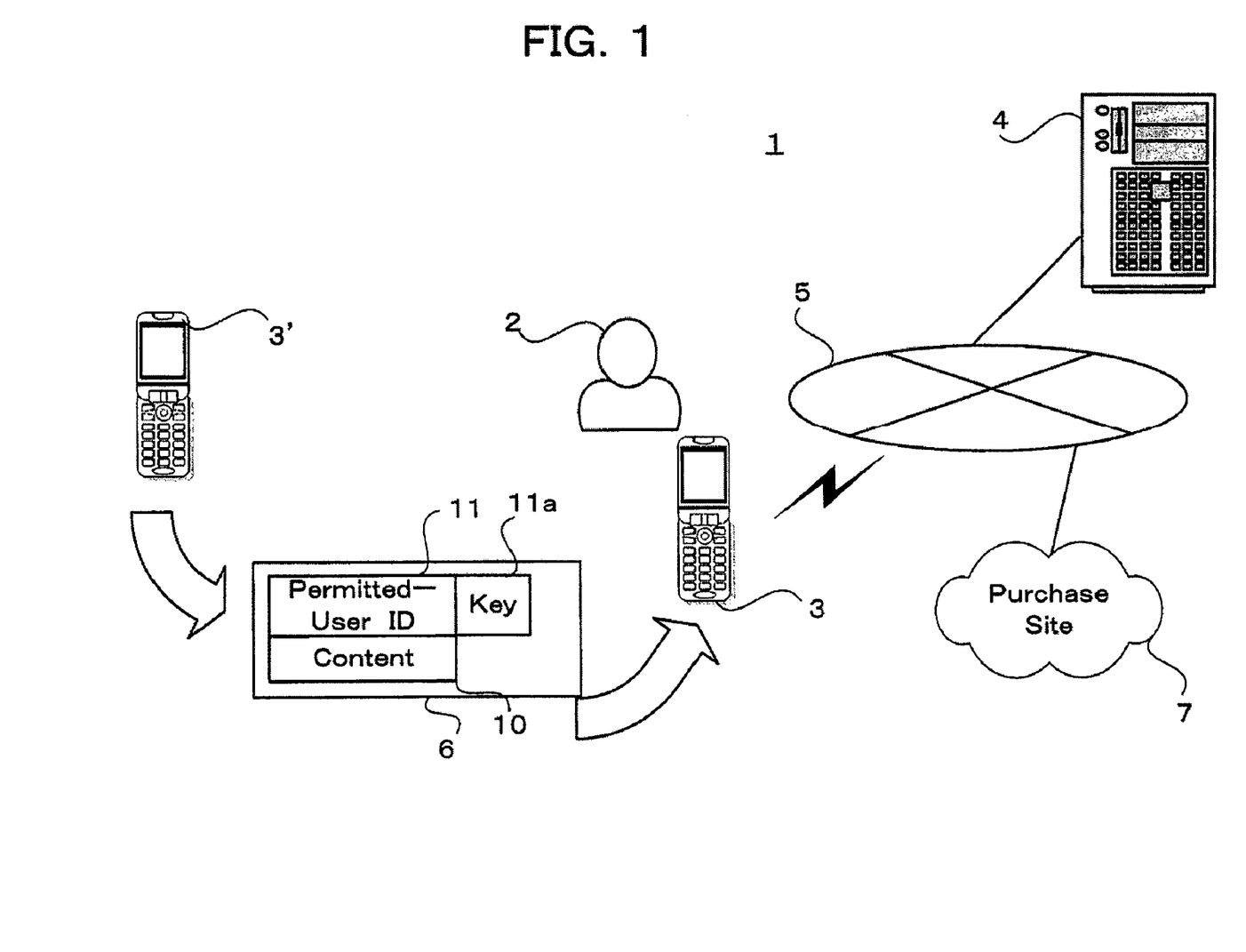
FIG. 1 is a diagram showing an example of a content distribution system of the present invention.

FIG. 1 is a diagram showing an example of a content distribution system 1 of the present invention. The content distribution system 1 has a user terminal 3 to accept operations of a user 2, and a server 4 capable of transmitting/receiving data to/from the user terminal 3. The user terminal 3 and the server 4 are connected to each other via a network 5. The user terminal 3 of the present embodiment is a portable phone owned by the user 2 and, therefore, the user terminal 3 and the network 5 are connected to each other partly by wireless communication. The user terminal 3 and the server 4 can be connected to a predetermined purchase site 7 via the network 5. The purchase site 7 is a site for performing a billing process on a content 10 and managed by a purchase serer. By obtaining from the server 4, a process ID necessary for performing a purchasing process in the purchase site 7, the purchasing process in the purchase site 7 can be performed by the user terminal 3.

The content 10 distributed in the content distribution system 1 is a game software. An SD card 6 can be inserted into the user terminal 3, and the content 10 is distributed from another user terminal 3' to the user terminal 3 via the SD card 6. That is, in the present embodiment, the user terminal 3 purchases the content 10 from the user terminal 3' as a purchase source. With the content 10, a permitted-user ID 11 indicative of a user terminal permitted to use the content 10 is associated. As described above, in the present embodiment, it is regarded that the user terminal and the user correspond to each other in a one-to-one manner, and use of the content 10 is permitted on a user terminal basis. The permitted-user ID 11 is encrypted with a secret key, and a public key 11a corresponding to the used secret key is associated with the permitted-user ID 11. In what follows, the permitted-user ID 11 associated with the public key 11a will be called a "permitted-user ID with key 11".

In the case of the present embodiment, at the moment when the content 10 is copied from the another user terminal 3' to the SD card 6, the permitted-user ID with key 11 indicative of another user terminal 3' is associated with the content 10 in the SD card 6. In this state, even in the case where the content 10 is obtained by the user terminal 3 via the SD card 6, as long as a process of changing the permitted-user ID 11 (hereinbelow, called "changing process") to make the permitted-user ID 11 of the content 10 indicate the user terminal 3 is not executed in the user terminal 3, the content 10 is not activated in the user terminal 3.

Figure 2:
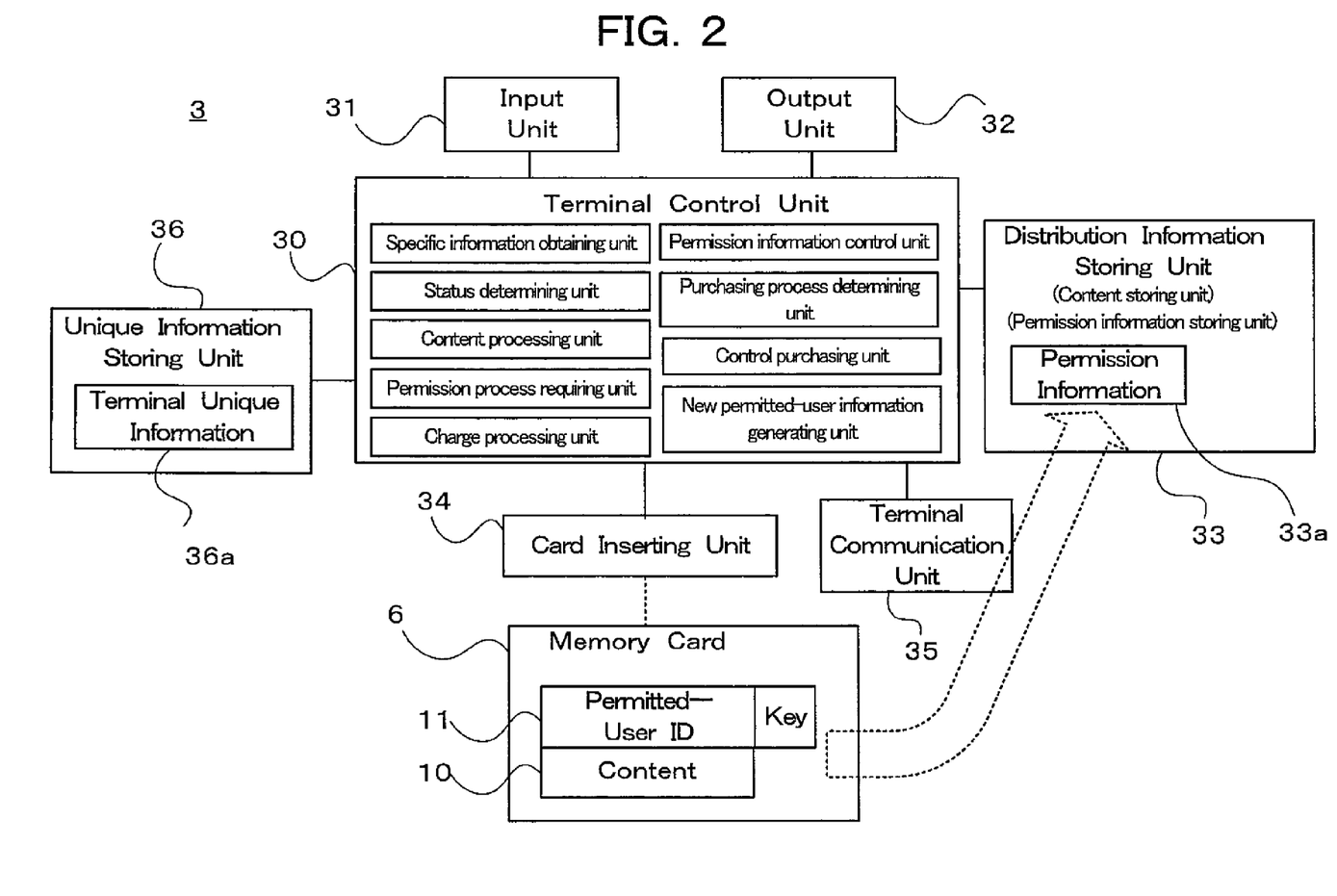
FIG. 2 is a schematic configuration diagram of hardware of a user terminal shown in FIG. 1.

A schematic configuration of hardware of the user terminal 3 will be described with reference to FIG. 2. All of user terminals in the present invention have a configuration similar to that of the user terminal 3. The user terminal 3 includes: an input unit 31 including buttons and keys for accepting operations of the user 2; an output unit 32 including a screen for outputting an image and a speaker for outputting sound; a distribution information storing unit 33 for storing a program for realizing the present invention and information related to distribution of the content 10; a card inserting unit 34 into which the SD card 6 is inserted; a terminal communication unit 35 as an interface of data communication performed with the server 4 and the purchase site 7; a unique information storing unit 36 in which terminal unique information 36a of the user terminal 3 is stored; and a terminal control unit 30 for controlling operations of the components 31 to 36.

The terminal control unit 30 mainly has a CPU and a storing area of a RAM, a ROM, and the like necessary for the operation of the CPU, and functions as a computer. By the program of the present invention, the terminal control unit 30 mainly functions as a status determining unit, a content processing unit, a permission process requesting unit, and a change processing unit. In the distribution information storing unit 33, permission information 33a as a flag indicative of whether the user terminal 3 is permitted to use the content or not is stored. The permission information 33a is prepared for each content. When the flag is set, it is indicated that using the corresponding content is permitted. The permission information 33a may be, for example, pre-stored in the distribution information storing unit 33. Alternatively, the permission information 33a may be generated when the content 10 is copied from the SD card 6 to the distribution information storing unit 33. Alternatively, the permission information 33a may be generated if it does not exist when the permission information 33a in the content 10 is referred to. The flag of the permission information 33a in the distribution information storing unit 33 is in a not-set state, as long as an ID changing process which will be described later is not executed in the user terminal 3. Thereby, the distribution information storing unit 33 functions as a permission information storing unit. The distribution information storing unit 33 is a readable/writable memory, but is protected so as not to be read by the user 2.

In the present embodiment, by copying the content 10 in the SD card 6 and the permitted-user ID with key 11 in the distribution information storing unit 33, the content 10 and the permitted-user ID with key 11 is held and used by the user terminal 3. Thereby, the distribution information storing unit 33 functions as a content storing unit. The terminal unique information 36a is information which is preset as unique information of the user terminal 3, and the unique information storing unit 36 is a read only memory. In the present embodiment, the terminal unique information 36a is a UID which is uniquely set for a portable phone. In what follows, the terminal unique information 36a will be called "UID 36a". As described above, in the embodiment, it is assumed that the user 2 and the user terminal 3 correspond to each other in a one-to-one manner. The UID 36a unique to the user terminal 3 functions as user specific information. In the case where the UID 36a is used in the content distribution system 1, the terminal control unit 30 obtains the UID 36a from the unique information storing unit 36. Thereby, the terminal control unit 30 functions as a specific information obtaining unit.

Figure 3:
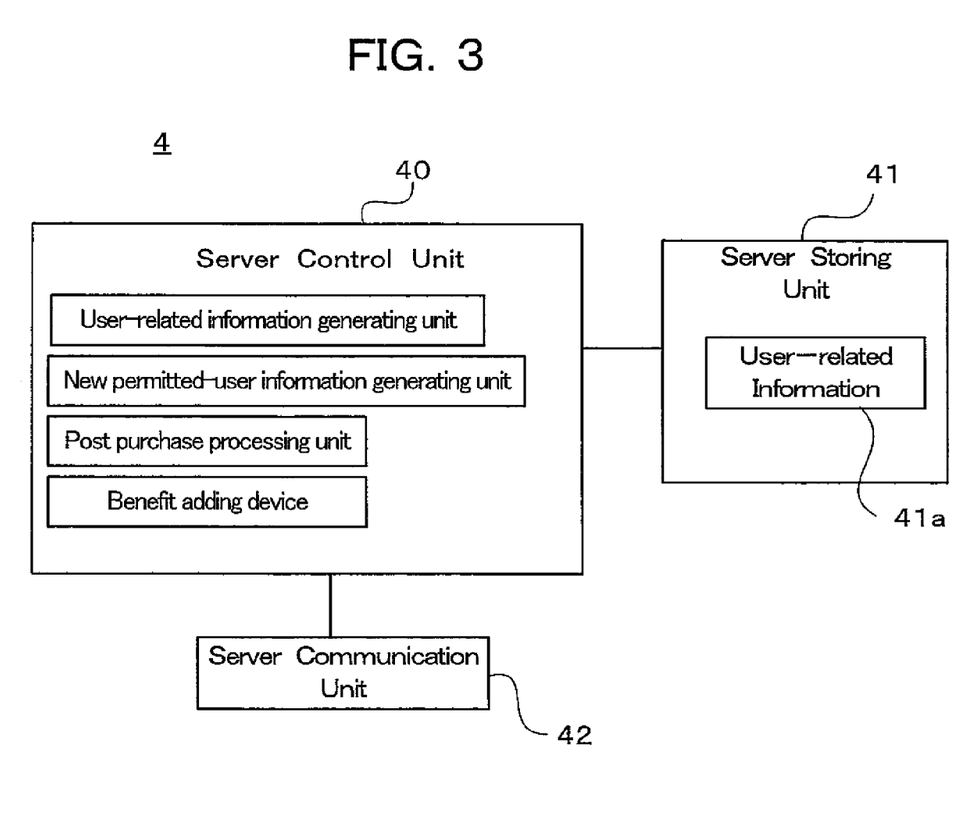
FIG. 3 is a schematic configuration diagram of hardware of a server shown in FIG. 1.
Figure 4:
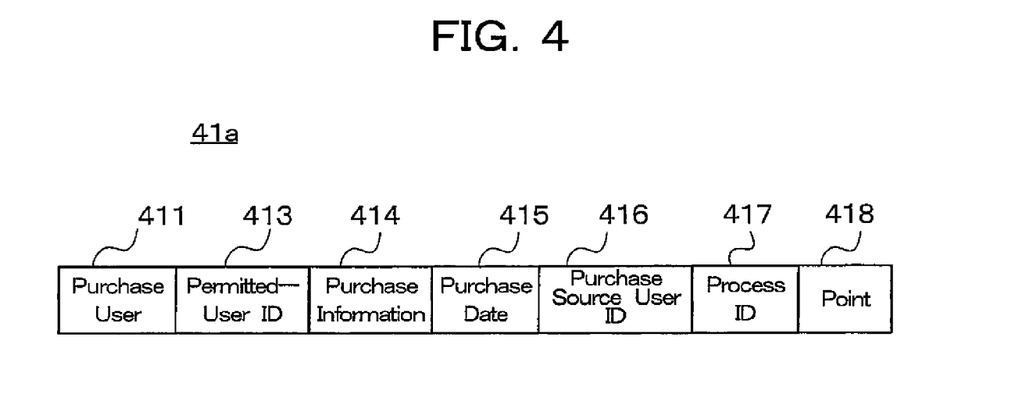
FIG. 4 is a diagram showing a data structure of user-related information held by the server shown in FIG. 1.

A schematic configuration of hardware of the server 4 will be described with reference to FIG. 3. The server 4 includes: a server storing unit 41 in which a program for realizing the present invention and various information is stored; a server communication unit 42 as an interface of data communication with the user terminal 3 and the purchase site 7, and a server control unit 40 to control the operation of each of the units 41 and 42. The server control unit 40 mainly has a CPU and a storing area of a RAM, a ROM, and the like necessary for the operation of the CPU, and functions as a computer. In the server storing unit 41, the program for realizing the present invention is stored. When the program is activated, the server 4 functions mainly as a user-related-information generating unit and a new permitted-user information generating unit. In the server storing unit 41, user-related information 41a is further stored. The data structure of the user-related information 41a is shown in FIG. 4.

The user-related information 41a is stored for each content. In the present embodiment, unless otherwise noted, the "user-related information 41a" indicates the user-related information 41a associated with the content 10. In the present embodiment, each content is identified by an identifier (hereinbelow, called "content identification information") constructed by a combination of a content name, a version number, and other unique information which enables identification. Therefore, the user-related information 41a is stored so that the corresponding content can be identified by the content identification information.

A purchase user 411 is the UID 36a of the user terminal 3 which purchased the content 10, that is, the distribution destination. A permitted-user ID with key 413 is information obtained by encrypting the UID 36a (purchase user 411) with a secret key. Purchase information 414 is a flag indicating whether the purchasing process of the content 10 has been finished in the user terminal 3 or not. When the flag is set, it indicates that the purchasing process has been finished. In this manner, the purchase state of the content 10 of the user terminal 3 is managed by the server 4.

A purchase date 415 indicates a date on which the purchasing process of the content 10 is executed. A purchase source user ID 416 indicates a permitted-user ID with key corresponding to the user terminal 3' as the purchase source, that is the distributor, of the content 10. A process ID 417 is identification information for identifying the user terminal 3 which executes the purchasing process at the purchase site 7. A point 418 indicates points given to the user terminal 3 when the user terminal 3 distributes the content 10 to another user terminal. For example, when the point 418 becomes a predetermined criterion or larger, a predetermined benefit is provided to the user terminal 3.

Figure 5:
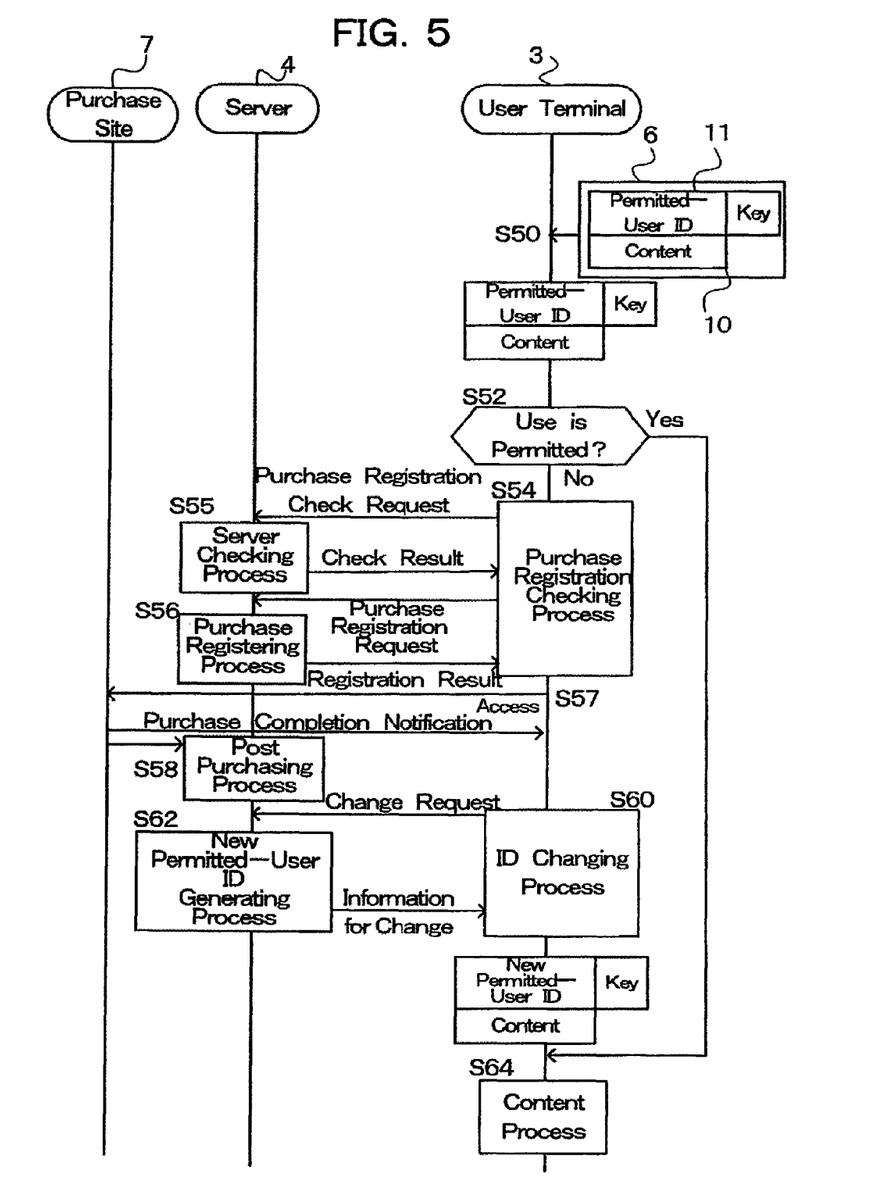
FIG. 5 is a sequence chart showing outline of the flow of processes executed in the server and the user terminal.

Outline of the flow of processes performed in the server 4 and the user terminal 3 in a period after insertion of the SD card 6 holding the content 10 copied from the user terminal 3' into the user terminal 3 until the content process using the content 10 is executed in the user terminal 3 will be described with reference to the sequence chart shown in FIG. 5. The processes in the server 4 and the processes in the user terminal 3 are controlled by the server control unit 40 and the terminal control unit 30, respectively. In the content process of the present embodiment, a game based on the content 10 is started.

First, when the SD card 6 is inserted into the card inserting unit 34 of the user terminal 3 and a predetermined operation is performed, the content 10 and the permitted-user ID with key 11 are copied in the distribution information storing unit 33 (step S50). At the moment of this copy, the permission information 33a corresponding to the content 10 is generated in a state where the flag is not set in the distribution information storing unit 33. The permitted-user ID with key 11 associated with the copied content 10 corresponds to the user terminal 3' as the purchase source of the content 10. For example, when starting operation for starting the content process in the user terminal 3 is performed, first, by referring to the permission information 33a, whether use of the permitted-user ID with key 11 is permitted or not is determined (step S52). When the use is permitted, the process advances to the content process where the content 10 is used (step S64). When the use is not permitted, a purchase registration checking process is performed (step S54).

In the purchase registration checking process, a purchase registration check request including the UID 36a of the user terminal 3 and the content identification information is transmitted to the server 4. By obtaining a check result from the server 4, whether the purchase registering process has been finished or not is determined. In the case where the purchase registering process has not been finished, the purchase registration request including the content identification information, the UID 36a, and the permitted-user ID with key 11 is transmitted to the server 4. In the server 4, when the purchase registration check request is received, the server checking process is performed (step S55). When the purchase registration request is received, the purchase registering process is performed (step S56).

In the server checking process, using the UID 36a and the content identification information included in the purchase registration check request as a key, the presence or absence of the user-related information 41a in the server storing unit 41 is determined, and the result is set as the check result. In the case where the user-related information 41a exists, the purchase information 414 gets included in the check result. Further, in the case where the purchase information 414 indicates that the purchasing process has been finished, the process ID 417 of the user-related information 41a gets also included in the check result. In the purchase registering process, the user-related information 41a of the user terminal 3 is generated on the basis of information included in the purchase registration request, and the registration result including the generated process ID 417 is transmitted to the user terminal 3. The details of the purchase registration checking process and the purchase registering process will be described later.

The user terminal 3 which has obtained the process ID 417 from the check result or the registration result accesses the purchase site 7 with the process ID 417, and executes a billing process necessary to purchase the content 10 (step S57). A conventional known process may be employed as the billing process. When the billing process is finished in the purchase site 7, a purchase completion notification including the process ID 417 is transmitted from the purchase site 7 to the server 4 and the user terminal 3. In the server 4 which has received the purchase completion notification, a post purchasing process is performed (step S58). In the post purchasing process, the user-related information 41a of the user terminal 3 is retrieved using the process ID 417 as a key, and the retrieved user-related information 41a is set to the state at the moment when the purchasing process has been executed. The post purchasing process will be described later.

On the other hand, in the user terminal 3 which has received the purchase completion notification, the process advances to an ID changing process to change the permitted-user ID with key 11 in the distribution information storing unit 33 (step S60). In the ID changing process, a change request including the UID 36a, the permitted-user ID with key 11, and the content identification information is transmitted to the server 4. Information for change including a new permitted-user ID with key generated on the basis of the transmitted UID 36a is obtained from the server 4. The permitted-user ID with key 11 associated with the content 10 is changed to the obtained new permitted-user ID with key. The details of the ID changing process will be described later. After completion of the ID changing process, the process advances to the content process (step S64).

In the server 4 which has received the change request, a new permitted-user ID generating process is executed (step S62). In the new permitted-user ID generating process, a new permitted-user ID is generated on the basis of the UID 36a included in the received change request, and the information for change including the new permitted-user ID with key in which the public key and the new permitted-user ID are associated with each other is transmitted to the user terminal 3. The details of the new permitted-user ID generating process will be described later.

Figure 6:
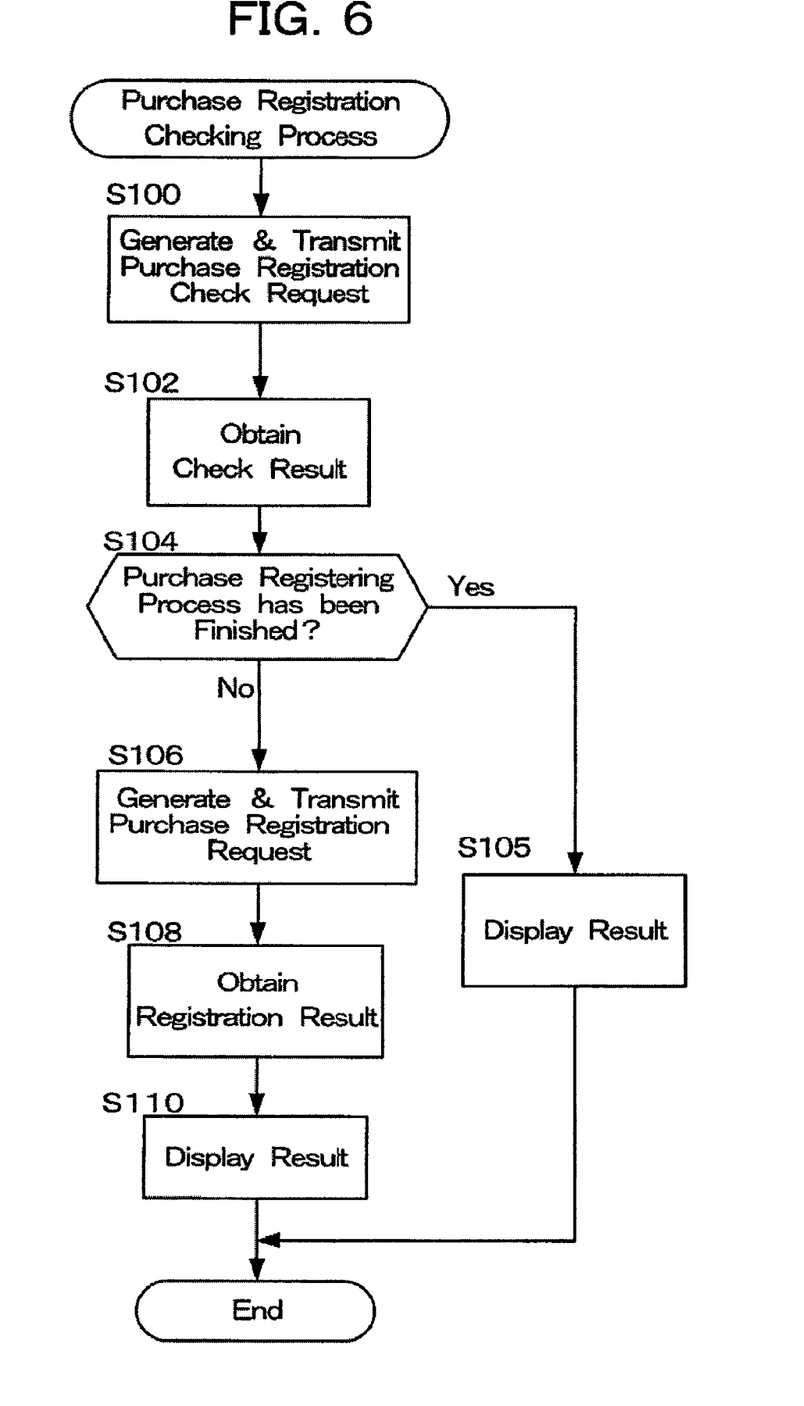
FIG. 6 is a flowchart showing the flow of processes in purchase checking process shown in FIG. 5.

The purchase registration checking process executed in the user terminal 3 will be described in accordance with the flowchart shown in FIG. 6. The processes in the purchase registration checking process are controlled by the terminal control unit 30 of the user terminal 3. First, in step S100, the purchase registration check request is generated and transmitted to the server 4. The purchase registration check request includes the content identification information of the content and the UID 36a. By transmitting the purchase registration check request, the check result is obtained from the server 4 in step S102. Subsequently instep S104, whether the purchase registering process has been finished or not is determined on the basis of the obtained check result.

In the case where the purchase information 414 is included in the check result, it is determined that the purchase registering process has been finished, and the process advances to step S105. In step S105, in the case where it is determined that the purchasing process has been finished on the basis of information indicated by the purchase information 414, a message indicating that the purchasing process has been finished is displayed on the screen. In the case where the purchasing process has not been performed yet, a message for prompting the purchasing process and the process ID 417 for accessing the purchase site 7 are displayed. After that, the purchase registration checking process is finished.

In the case that the check result indicates that the user-related information 41a of the user terminal 3 does not exist, it is determined that the purchase registering process has not been finished. In this case, the process advances to step S106 to generate and transmit to the server 4 the purchase registration request. The purchase registration request includes the UID 36a and the content identification information of the content 10. Subsequently, the registration result from the server 4 is obtained in step S108. The registration result includes a notification indicating that the user-related information 41a of the user terminal 3 has been generated and the process ID 417 for accessing the purchase site 7. After the registration result is obtained, the process advances to step S110 to display on the screen, for example, a message urging the user 2 to perform the purchasing process and the process ID 417. After that, the purchase registration checking process is finished.

Figure 7:
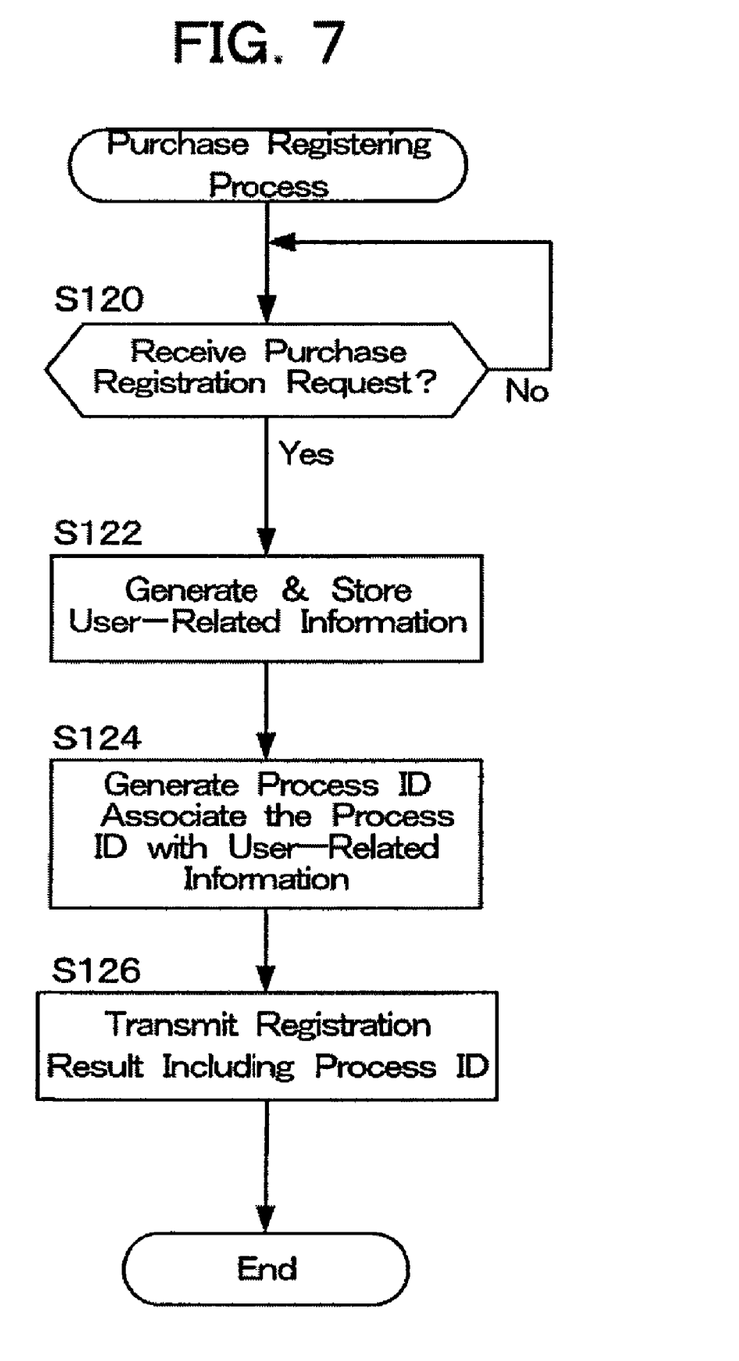
FIG. 7 is a flowchart showing the flow of processes in purchase registering process shown in FIG. 5.

Next, the purchase registering process performed in the server 4 which has received the purchase registration request will be described with reference to the flowchart shown in FIG. 7. The processes in the purchase registering process are controlled by the server control unit 40 in the server 4. First, in step S120, whether the purchase registration request has been received or not is determined. In the case where the purchase registration request is received, the process advances to step S122 to generate the user-related information 41a on the content 10 is generated on the basis of information included in the purchase registration request. The UID 36a and the permitted-user ID with key 11 included in the purchase registration request are set as the purse user 411 and the purchase source user ID 416, respectively.

At the moment of generating the user-related information 41a, there is no data other than the above-described two pieces of data, and the purchase information 414 indicates that the purchasing process has not been finished. The generated user-related information 41a is stored in the server storing unit 41. After generating the user-related information 41a, the process advances to step S124 to generate a process ID 417 necessary to access the purchase site 7, and set the generated process ID 417 in the user-related information 41a. Subsequently in the step S126, a registration result including the generated process ID 417 is transmitted to the user terminal 3. After that, the purchase registering process is finished.

Figure 8:
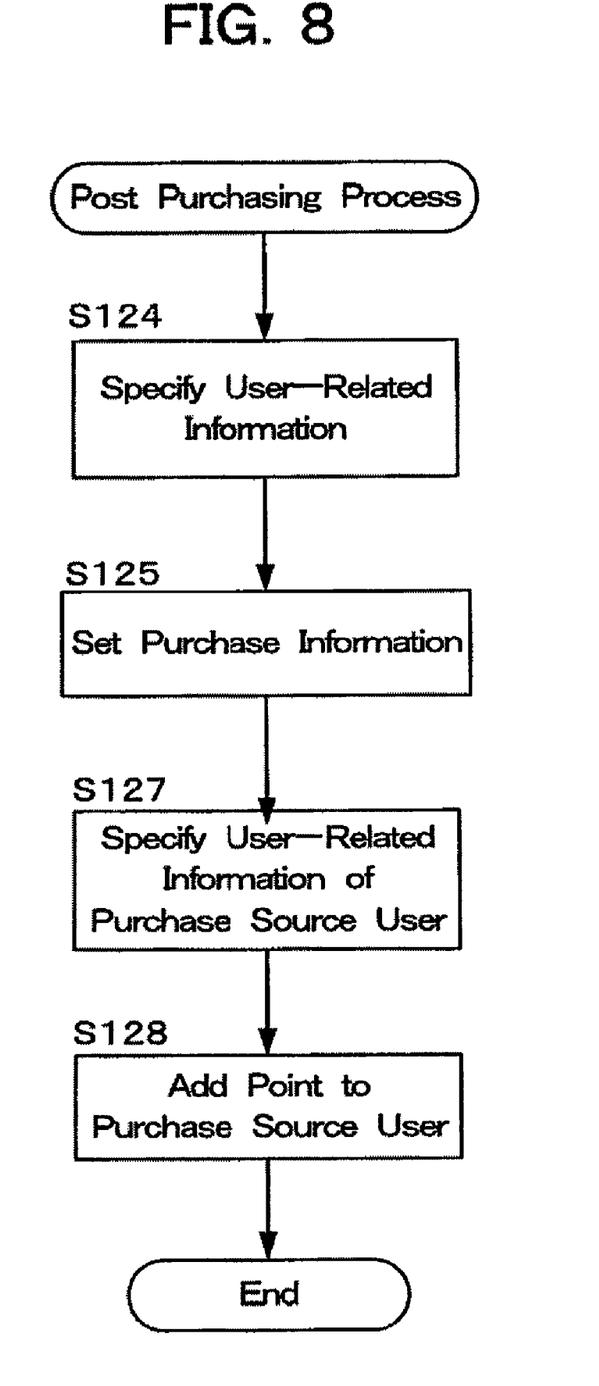
FIG. 8 is a flowchart showing the flow of processes in post purchasing process shown in FIG. 5.

The post purchasing process executed by the server 4 will be described with reference to the flowchart shown in FIG. 8. First, in step S124, using the process ID 417 included in the purchase completion notification as a key, the user-related information 41a to be processed is specified with reference to the server storing unit 41. Subsequently, in step S125, the purchase information 414 in the specified user-related information 41a is set so as to indicate that the purchasing process has been finished, and purchase date 415 is set. Next, the process advances to step S127 to refer to the purchase source user ID 416 of the specified user-related information 41a. Since the user ID with key of the user terminal 3', that is the purchase source, is set in the purchase source user ID 416, the user ID with key is decoded to obtain the UID 36a' of the purchase source user terminal 3'. Using the UID 36a' as a key, the user-related information 41a' of the purchase source user terminal 3' is specified.

When the user-related information 41a' is specified, the process advances to step S128 to add predetermined points to the point 418' of the user-related information 41a'. Thereby, the purchase source user terminal 3' is configured so that the point 428' increases as the content 10 is distributed to another user more times. After the process on the point 418', the post purchasing process is finished.

Figure 9:
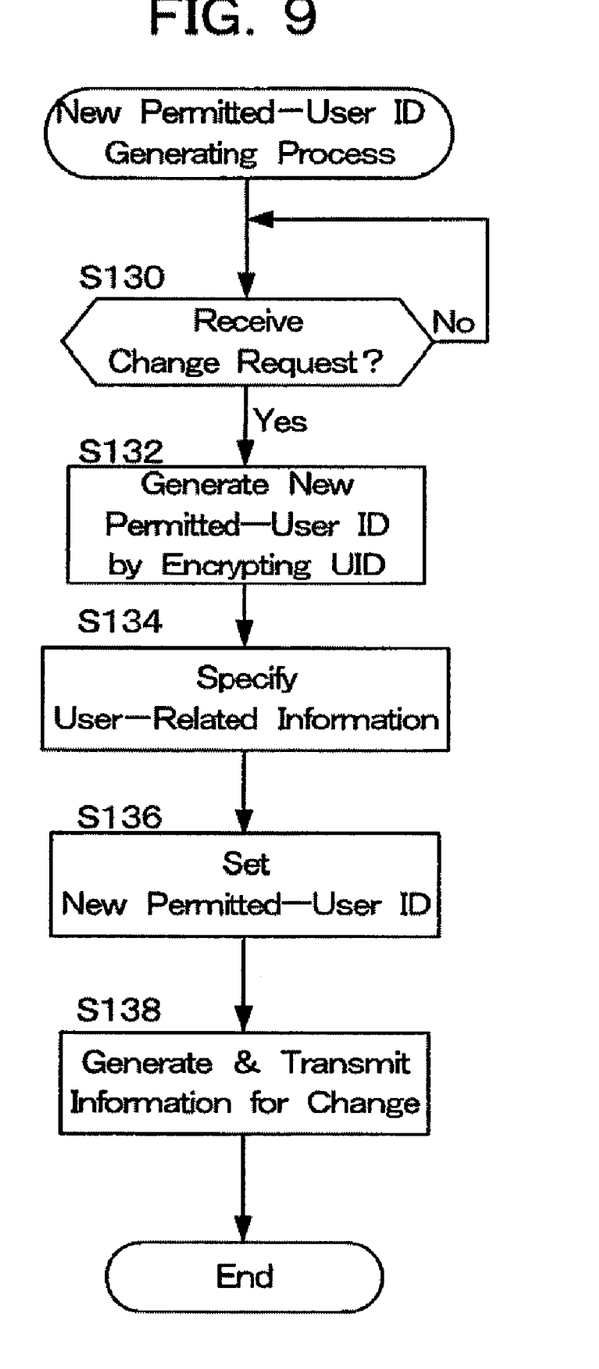
FIG. 9 is a flowchart showing the flow of processes in new permitted-user ID generating process shown in FIG. 5.

A new permitted-user ID generating process executed in the server 4 which has received the change request will be described with reference to the flowchart shown in FIG. 9. The processes in the new permitted-user ID generating process are controlled by the server control unit 40 of the server 4. First, in step S130, whether the change request has been received or not is determined. In the case where it is determined that the change request is received, the process advances to step S132 to generate a new permitted-user ID by encrypting the UID 36a included in the change request with a predetermined secret key. The new permitted-user ID is associated with the public key corresponding to the encrypted secret key, and dealt as a new permitted-user ID with key.

Next, in step S134, by referring to the server storing unit 41 using the UID 36a and the content identification information included in the change request as keys, the user-related information 41a is specified. After the user-related information 41a is specified, the process advances to step S136 to set the generated new permitted-user ID with key in the permitted-user ID 413 in the specified user-related information 41a. After that, the process advances to step S138 to generate and transmit the information for change including the generated new permitted-user ID with key and the content identification information. And then, the new permitted-user ID generating process is finished.

Figure 10:
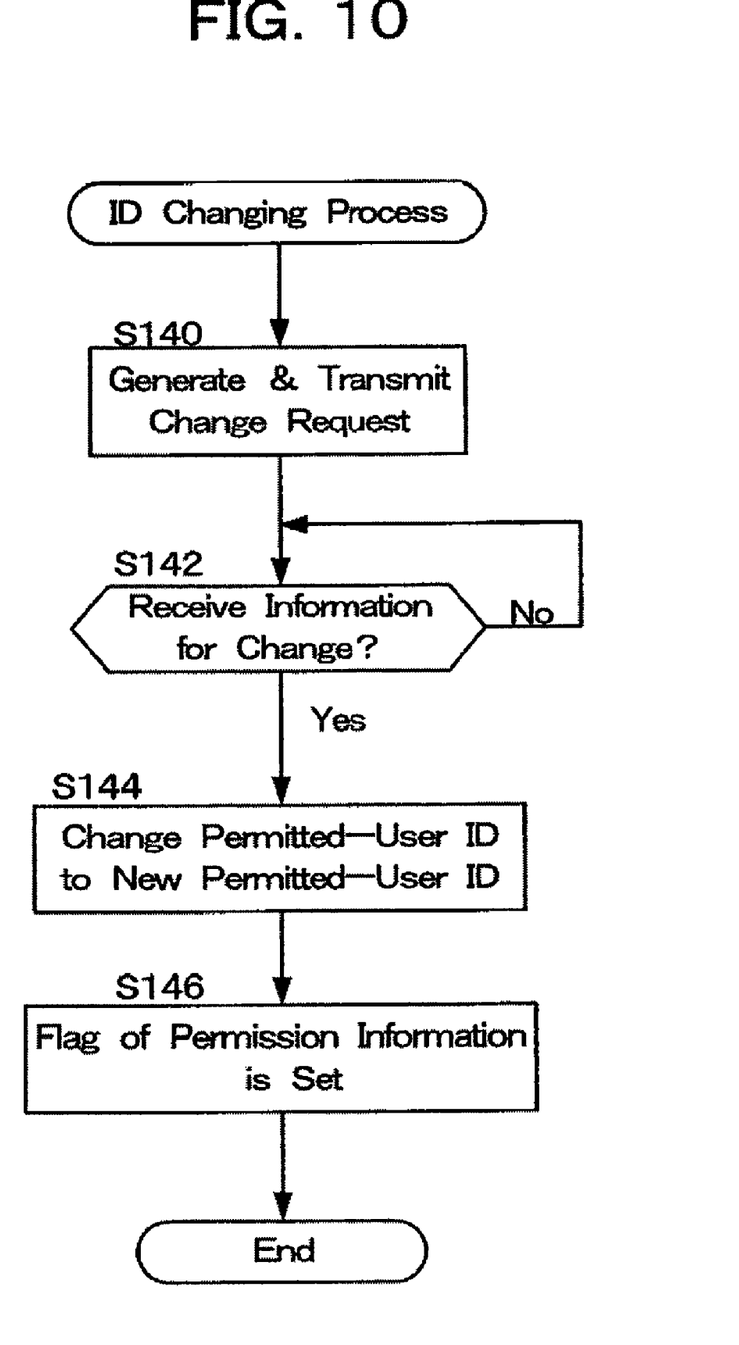
FIG. 10 is a flowchart showing the flow of processes in ID changing process shown in FIG. 5.

An ID changing process executed in the user terminal 3 with respect to the change in the permitted-user ID 11 will be described with reference to the flowchart shown in FIG. 10. The processes in the ID changing process are controlled by the terminal control unit 30 of the user terminal 3. First, in step S140, the change request including the content identification information of the content 10 and the UID 36a is generated and transmitted to the server 4. After that, the user terminal 3 comes into a state of waiting for reception of the information for change, and it is determined whether the information for change has been received or not in step S142.

In the case where it is determined that the information for change has been received, the process advances to step S144 to change the permitted user ID with key 11 stored in the distribution information storing unit 33 is changed to the new permitted-user ID with key included in the information for change. Thereby, the permitted-user ID 11 associated with the content 10 held in the user terminal 3 becomes information having a predetermined relation with the terminal unique information 36a of the user terminal 3. Subsequently, the process advances to step S146 to set a flag of the permission information 33a corresponding to the content 10 stored in the distribution information storing unit 33. Thereby, the user terminal 3 comes into a state that the use of the content 10 is permitted by completing the changing process, and the use of the content 10 is permitted. After executing a process for the permission information 33a, the ID changing process is finished.

The terminal control unit 30 functions as a status determining unit by step S52, functions as a permission process requesting unit by steps S106 and S140, and functions as a change processing unit by step S144. The server control unit 40 functions as a user-related information generating unit by step S122 and functions as a new permitted-user information generating unit by step S132. Further, the terminal control unit 30 functions as a permission information control unit by step S146, functions as a purchasing process determining unit by step S104, and functions as a content purchasing unit by step S57. The server control unit 40 functions as a pos purchasing process unit by steps S124 and S125, and functions as benefit adding unit by steps S127 and S128.

Figure 11:
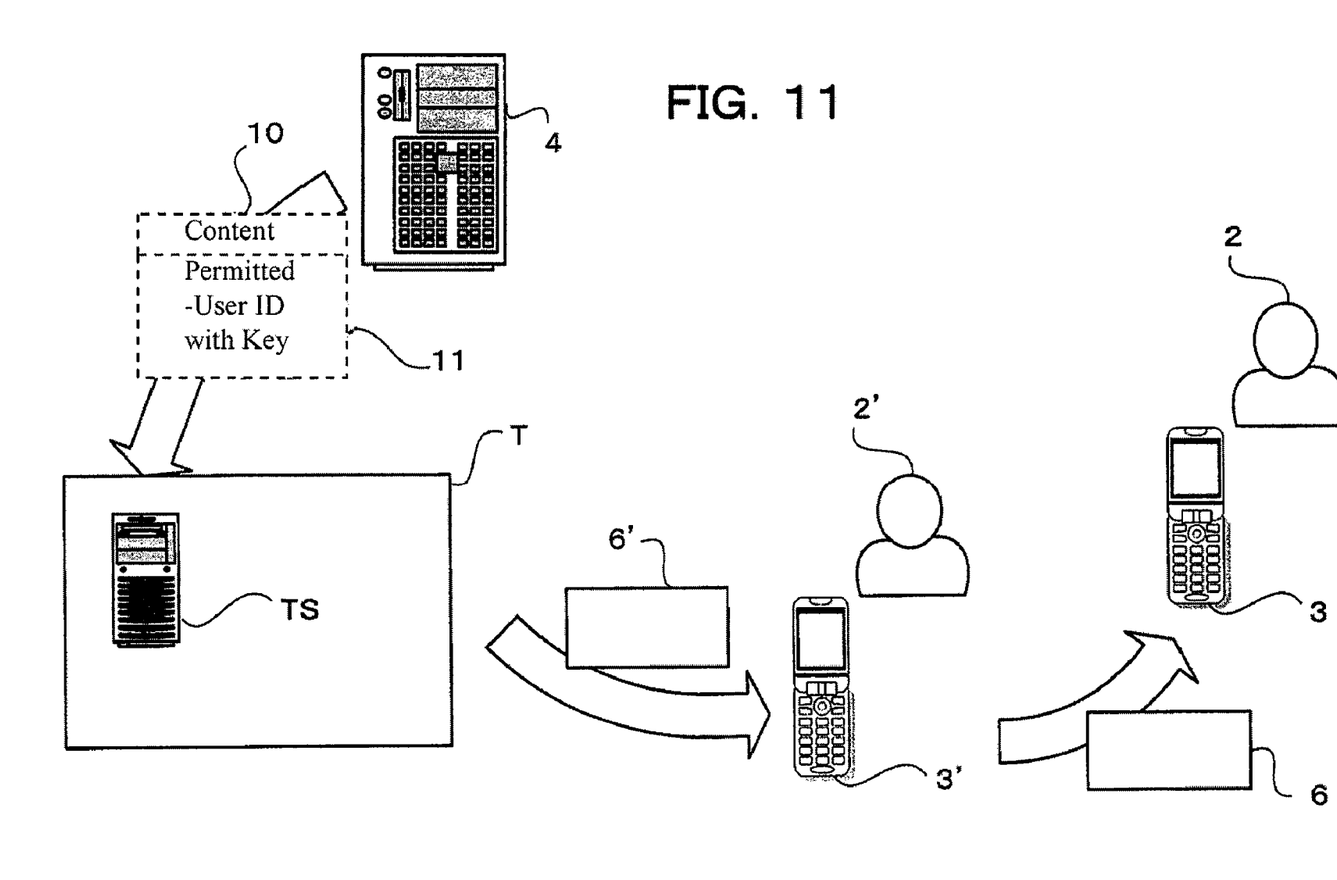
FIG. 11 is a diagram showing a state where content is provided from a server to be distributed to a plurality of user terminals.

Finally, the flow since the content 10 is provided from the server 4 to a shop T until the user 2 purchases the content 10 via the user 2' from the shop T will be described with reference to FIG. 11. First, the shop T obtains the content 10 by downloading it from the server 4. For example, it is sufficient to download the content 10 in a shop server TS. The permitted-user ID 11 at that moment is generated by encrypting shop unique information which is unique to a shop T in the server 4.

The shop T stores the content 10 in an SD card 6' and sells the SD card 6'. The user 2' purchases the SD card 6' and inserts it into the user terminal 3' of his/her own. When the content 10 and the permitted-user ID with key 11 are copied from the SD card 6' to the distribution information storing unit 33' in the user terminal 3', the processes in step S50 and subsequent steps shown in FIG. 5 are executed. In the ID changing process in step S60, the permitted-user ID with key 11 is changed to a new permitted-user ID with key corresponding to the UID 36' of the user terminal 3'.

Next, when the user 2 obtains the content 10 from the user 2', the user 2' copies and distributes to the user 2, the content 10 and the permitted-user ID with key 11 held in the distribution information storing unit 33' into the SD card 6. Processes executed after the user 2 obtains the SD card 6 until the permitted-user ID with key 11 is changed to the new permitted-user ID corresponding to the UID 36a of the user terminal 3 are as described above. In this manner, also when the user 2 distributes the content 10 to the other user, processes similar to those at the moment when the user 2' distributes the content 10 to the user 2 are executed.

The present invention is not limited to the foregoing embodiments but may be realized in various modes. For example, without using the permission information 33a, by directly comparing the permitted-user ID 11 with the terminal unique information 36a in step S52, permission/inhibition may be determined. In this case, step S146 in the ID changing process is unnecessary. The content 10 may not be copied to the distribution information storing unit 33 provided in the user terminal 30 but may be used while being held in the SD card 6. In this case, the SD card 6 functions as a content storing unit, and the permitted-user ID with key 11 in the SD card 6 is changed to a new permitted-user ID with key. The permission information 33a is generated in the distribution information storing unit 33.

In this case, a mode of obtaining the content 10 stored in the SD card 6' of the user 2' as a purchase source from the user 2' includes a case where the SD card 6' is obtained as it is, and a case where the content 10 is copied from the SD card 6' to another SD card 6 via a personal computer. The content 10 may be distributed via a recording medium other than an SD card, such as an MD or a CD-ROM, or may be directly copied between the user terminals 3 and 3'. As the user specific information, information specifying the user may be sufficient. In the case where the user terminal 3 is a portable phone, the user specific information may be the information recorded on an SIM card or UIM card.

Further, game software may be preliminarily downloaded from a predetermined server and held in the user terminal 3, and the content 10 distributed via the SD card 6 may be large-amount data such as an image or music used in the game software. In this case, for example, when the game is started, the permission information 33a is determined. The number of content to be distributed in the content distribution system may be one. In this case, it is unnecessary to identify the kind of the content 10 by using the content identification information in the system. Not the terminal unique information 36a which is unique to the user terminal 3, user identification information uniquely given to the user 2 may be applied to the information specifying the user 2. In this case, for example, the user terminal 3 may be provided with the distribution information storing unit 33 for each user identification information so that processes can be executed for each user even if the same user terminal 3 is used.

The invention claimed is:

1. A content distribution system including a user terminal programmed to be operated by a user and a server programmed to transmit data to or receive data from the user terminal, the user terminal comprising a specific information obtaining unit programmed to obtain user-specific information that specifies the user;

wherein the user terminal further comprises:
a content storing unit programmed to store a content with which permitted-user information indicative of a user permitted to use the content is associated;
a status determining unit programmed to determine that a user corresponding to the user-specific information is permitted to use the content in a case where the user-specific information and the permitted-user information has a predetermined relation, and that the user is not permitted to use the content in a case where the user-specific information and the permitted-user information does not have the predetermined relation;
a content processing unit programmed to execute a process using the content in a case where it is determined by the status determining unit that the use is permitted;
a permission process requesting unit programmed to, in a case where the status determining unit determines that the use is not permitted, transmit to the server the user-specific information obtained by the specific information obtaining unit and the permitted-user information associated with the content; and
a change processing unit programmed to, when new permitted-user information is obtained from the server, change the permitted-user information associated with the content to the new permitted-user information, and the server comprises:
a user-related information generating unit programmed to generate and store user-related information in which the user-specific information transmitted from the user terminal is set to a distribution destination and the permitted-user information is set to a distributor; and
a new permitted-user information generating unit programmed to generate and provide to the user terminal, the new permitted-user information so as to have the predetermined relation with the user-specific information transmitted from the user terminal.

2. The content distribution system according to claim 1, wherein:
the user terminal has a unique information storing unit programmed to store terminal unique information that is unique to the user terminal, and
the specific information obtaining unit is programmed to obtain, as the user-specific information, the terminal unique information from the unique information storing unit.

3. The content distribution system according to claim 2, wherein the user terminal further comprises:
a permission information storing unit programmed to store permission information indicative of whether the user-specific information and the permitted-user information has the predetermined relation or not; and
a permission information control unit programmed to control the permission information so as to indicate that the predetermined relation is not established until the permitted-user information is changed by the change processing unit, and indicate that the predetermined relation is established when the permitted-user information is changed, and
the status determining unit is further programmed to determine whether the use is permitted or not by referring to the permission information.

4. The content distribution system according to claim 1, wherein:

the user terminal is programmed to connect to a purchase site for performing a purchasing process related to purchase of the content, the permission process requesting unit of the user terminal includes a purchasing process determining unit programmed to determine that the purchasing process is not performed when the user-related information in which the user terminal information is set to the distribution destination is not stored in the server, and when it is determined that the use is not permitted and that the purchasing process is not performed, and the permission process requesting unit transmits a purchase registration request including the user-specific information and the permitted-user information, the user-related information generating unit of the server that receives the purchase registration request is programmed to generate the user-related information by the user-specific information and the permitted-user information included in the received purchase registration request, and further, generate and transmit to the user terminal, information necessary for connection to the purchase site, the user terminal has a content purchasing unit programmed to connect to the purchase site by the necessary information obtained from the server, and a new permitted-user information generating unit of the server is programmed to generate the new permitted-user information by the user-specific information corresponding to a user who has performed the purchasing process.

5. The content distribution system according to claim 4, wherein:

the user-related information generating unit of the server is programmed to generate, as the necessary information, purchasing process identifying information uniquely given to the user, transmit the generated purchasing process identifying information to the user terminal, and store the generated purchasing process identifying information so as to be associated with the generated user-related information, the server includes a post purchase processing unit programmed to, when obtaining the purchasing process identifying information used for the purchasing process from the purchase site, specify the user-related information corresponding to the purchasing process identifying information, and associate purchase information indicating that the purchasing process has been performed with the specified user-related information, the purchasing process determining unit in the user terminal is programmed to, in a case where the user-related information is stored, determine whether the purchasing process was performed or not by referring to the purchase information, the permission process requesting unit of the user terminal is programmed to, in a case where the purchasing process determining unit determines that the purchasing process has been performed, transmit a new user information request including the user-specific information, and the new permitted-user information generating unit of the server is programmed to, on receipt of the new user information request, generate the new permitted-user information by the user-specific information included in the new user information request.

6. The content distribution system according to claim 1, wherein the server further comprises a benefit adding unit programmed to specify the user-specific information having the predetermined information with the permitted-user information that is set to the distributor in the user-related information, retrieve the user-related information in which the specified user-specific information is set to the distribution destination, and add predetermined benefit information to the retrieved user-related information.

7. The content distribution system according to claim 1, wherein the new permitted-user information generating unit is programmed to generate the new permitted-user information by encrypting the user-specific information.

8. The content distribution system according to claim 2, wherein the user terminal is a portable terminal.

9. A content distribution method performed by a user terminal operated by a user and a server capable of transmitting and receiving data to and from the user terminal, the user terminal comprising a specific information obtaining unit programmed to obtain user-specific information that specifies the user, wherein the user terminal performs:
a step of storing a content with which permitted-user information indicative of a user permitted to use the content is associated;
a step of determining that a user corresponding to the user-specific information is permitted to use the content in a case where the user-specific information and the permitted-user information has a predetermined relation, and determining that the use is not permitted to use the content in a case where the user-specific information and the permitted-user information does not have the predetermined relation;
a step of executing a process using the content in a case where it is determined that the use is permitted;
a step of transmitting, in a case where it is determined that the use is not permitted, to the server, the obtained user-specific information and the permitted-user information associated with the content; and
a step of changing, when new permitted-user information is obtained from the server, the permitted-user information associated with the content to the new permitted-user information, and the server performs the steps of:
a step of generating and storing user-related information in which the user-specific information transmitted from the user terminal is set to a distribution destination and the permitted-user information is set as a distributor; and
a step of generating and providing to the user terminal, the new permitted-user information so as to have the predetermined relation with the user-specific information transmitted from the user terminal.

* * * * *